United States Patent [19]

Fekete

[11] Patent Number: 4,645,319
[45] Date of Patent: Feb. 24, 1987

[54] COMPOSITE OPTICAL IMAGE PROJECTION SYSTEM

[76] Inventor: Denes Fekete, 8 Eagle La., Hauppauge, N.Y. 11788

[21] Appl. No.: 719,519

[22] Filed: Apr. 3, 1985

[51] Int. Cl.$^4$ ............................................. G03B 21/10
[52] U.S. Cl. ........................................ 353/31; 353/84; 353/15; 353/37
[58] Field of Search ..................................... 353/30–37, 353/82, 84, 20, 121, 122, 1, 15, 94, 98, 99; 84/464 R; 362/811; 272/8 P, 10

[56] References Cited

U.S. PATENT DOCUMENTS

| | | | |
|---|---|---|---|
| 944,787 | 12/1909 | Jumeaux | 353/33 |
| 973,961 | 10/1910 | Oliver | 353/33 |
| 973,962 | 10/1910 | Oliver | 353/37 |
| 1,946,026 | 2/1934 | Lewis et al. | 84/464 |
| 2,028,485 | 1/1936 | Wright | 353/34 X |
| 3,241,419 | 3/1966 | Gracey | 353/15 X |
| 3,623,392 | 11/1971 | Boyer | 84/464 |
| 3,635,121 | 1/1972 | Knauff | 84/464 |
| 3,922,080 | 11/1975 | Kodama et al. | 353/31 X |
| 4,222,641 | 9/1980 | Stolov | 353/84 |
| 4,368,963 | 1/1983 | Stolov | 353/31 |

FOREIGN PATENT DOCUMENTS

| | | | |
|---|---|---|---|
| 2434575 | 2/1975 | Fed. Rep. of Germany | 353/15 |
| 2555859 | 6/1976 | Fed. Rep. of Germany | 353/120 |
| 558986 | 6/1923 | France | 353/30 |

Primary Examiner—Harry N. Haroian
Attorney, Agent, or Firm—Edward H. Loveman

[57] ABSTRACT

In this optical image projection system, a composite image is produced by the superimposition of images from a plurality of separate optical projectors. Each optical projector includes a lamp, a transparency, colored light filters and a projection lens. One projector projects an image directly onto the screen. The other optical projectors include mirrors adjustable to superimpose their images with the directly projected image to form a composite image. The intensity of the lamps may be modulated by a color organ driven by an audio signal source to produce color images which change in intensity and hue reflecting the spectral content of the audio source. The composite image may also be changed with time by using liquid crystal display matrixes modulated by applied video signals.

9 Claims, 5 Drawing Figures

COMPOSITE OPTICAL IMAGE PROJECTION SYSTEM

BACKGROUND OF THE INVENTION

1. Field of Invention

This invention relates to the art of optical time variable composite image projection systems and more specifically it concerns a system for producing colored composite optical images at variable projector to screen distances.

2. Prior Art

Composite light projection systems are known in which a plurality of images are superimposed by the overlapping of individual images from a number of projectors. In these systems the composite image coccurs at a fixed image distance from the projectors. Changing the screen to projector distance requires the reorientation and refocusing of a multitude of individual projectors. For precision overlap this becomes quite difficult requiring precise mechanical alignment between the various projectors. In the present invention, this problem is overcome by the use of mirrors placed between the projection lens and screen.

SUMMARY OF INVENTION

The present invention is directed at providing a new projection system in which multiple images are superimposed on a screen. According to the invention, the new system employs a plurality of projection lamps placed in laterally spaced positions. The light from each lamp is collinated to produce a light beam having parallel rays. The light beam is then passed through a transparency, a color filter, and a projection lens. One beam is projected directly on a screen or other imaging surface. Each other beam is passed between stationary and movable mirrors. The movable mirrors are oriented to superimpose their images on the direct image.

In one embodiment the light from the projection lamps is passed through three identical black and white slides that were obtained photographicially by using various primary filters in front of the camera. The same color filters are then used in the projector to produce a single color picture from the three black and white transparencies.

In another application the black and white transparencies are replaced with liquid crystal matrixes which are changed in time by signals from a video receiver. For this mode the multiple image color projector becomes a television projection system.

In yet another application a color organ is used to drive the projection lamps of the projector. The superimposed images cast on the screen change in the hue and intensity in accordance with the changes in amplitude of the various frequency output bands of the color organ.

OBJECTS OF THE INVENTION

It is therefore a principal object of the present invention to provide a composite optical image projection system with novel means for superimposing modulated light beams to form a composite image upon a screen or other imaging surface.

A further object of the present invention is to provide a system as described, wherein a plurality of modulated light beams are spaced laterally of each other and are projected by mirrors in mutual superimposition upon a common area of the imaging surface.

Another object of the present invention is to provide a system as described wherein the light beams are modulated by audio signals applied via a color organ to projection lamps for modulating the composite optical image in both intensity and hue.

Still another object of the present invention is to provide a composite optical image projection system in which light from projection lamps is passed through changeable filters to modulate the light beams projected by the lamps, and in which the modulated light of several beams is projected via mirrors to form a composite superimposed image on an image receiving and displaying surface.

These and other objects and many of the attendant advantages of this invention will be readily appreciated as the same becomes better understood by reference to the following detailed description when considered in connection with the accompanying drawings in which:

Figure 1:
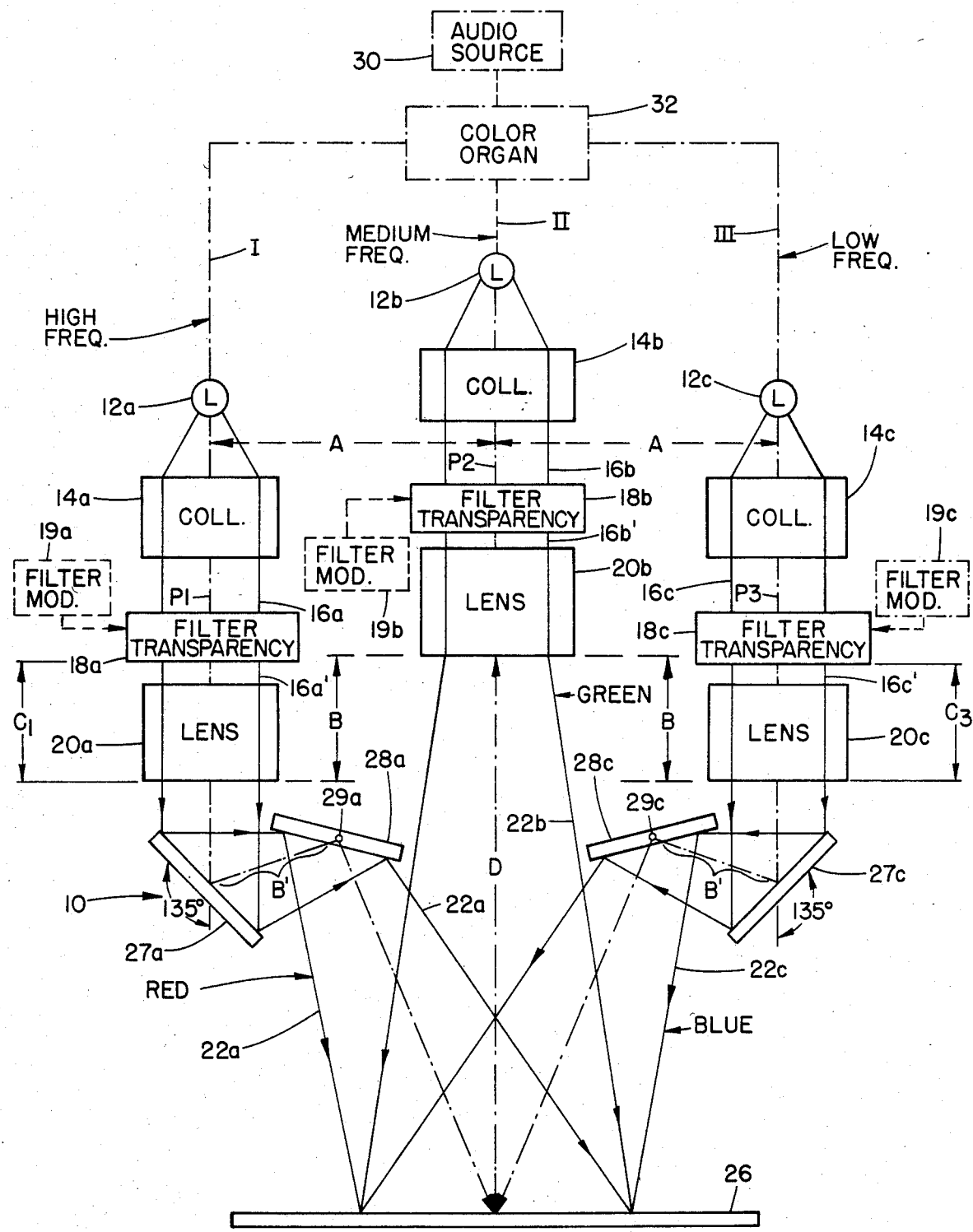
FIG. 1 is a block and optical diagram of an image projection system embodying the present invention, with optical paths shown in coplanar array.
Figure 2:
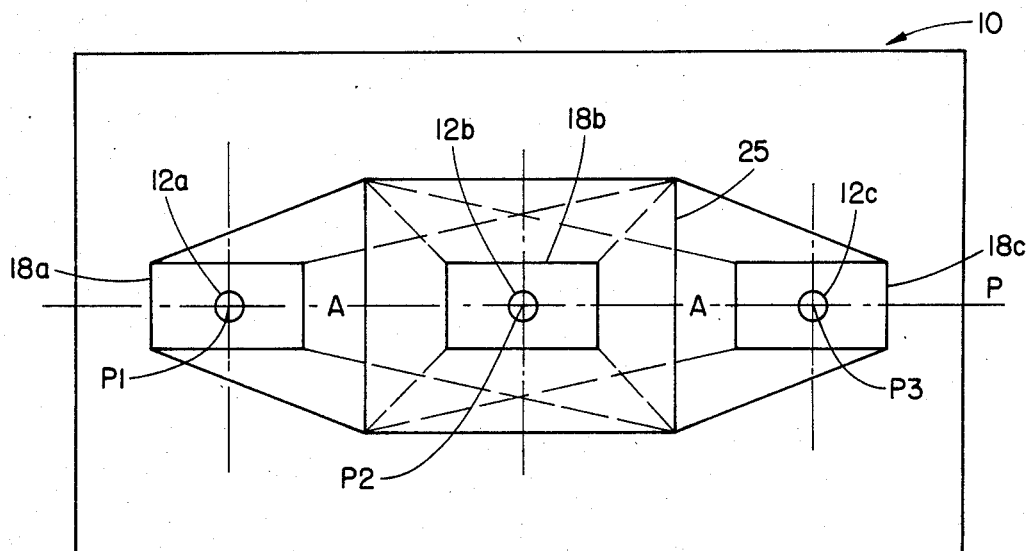
FIG. 2 is an optical diagram used in explaining the invention, the position of the three optical paths shown in FIG. 2 is perpendicular to the position of the three optical paths of FIG. 1.

Referring now to the drawings wherein like reference characters designate like or corresponding parts throughout there is illustrated in FIGS. 1 and 2, an optical system generally designated by reference numeral 10 which system employs three electric lamps 12a, 12b, and 12c, spaced laterally of each other in a plane P (FIG. 2). An optical path P2 is centered between optical paths P1 and P3 and spaced a distance A from each. In each optical path is a respective collimator 14a, 14b, 14c which is a lens array arranged to emit parallel light rays in a respective beam 16a, 16b, and 16c. A respective filter-transparency 18a, 18b, 18c is disposed in each optical path to pass the collimated light beam. The filtered, collimated light beam 16' then passes through a respective projection lens 20a, 20b and 20c. A divergent beam 22b from the projection lens 20b projected as an image 25 directly upon a projection screen 26 whose plane is disposed perpendicular to the optical path P2.

A divergent light beam 22a, from the projection lens 20a is projected upon a fixed mirror 27a disposed at an angle of 45 degrees to the optical path or axis P1. There the beam 22a is reflected to a mirror 28a rotatably adjustable on an axis 29a parallel to the plane of the mirror 27a. The divergent beam 22a reflected from the mirror 28a is projected on the screen 26 in superimposition with the beam 22b.

A divergent light beam 22c from the projection lens 20c is projected upon a fixed mirror 27c disposed at a 45 degree angle to the optical path P3. There the beam 22c is reflected to a mirror 28c rotatably adjustable on an axis 29c parallel to the plan of the mirror 27c. The divergent beam 22c reflected from the mirror 28c is projected on the screen 26 in superimposition with the beams 22a and 22b to define a composite image 25.

It will be noted that the lenses 20a and 20c are spaced a distance B from the lens 20b taken in the parallel direction of the optical paths P1, P2, and P3. This distance corresponds to distance B' which is the distance between the centers of the mirrors 27a, 28a and 27c, 28c. Since the distance B' between each respective pair of mirrors is substantially equal to the optical displacement distance B between the center lens 20b and the lateral lenses 20a, 20c, the image distance or length of the optical paths P1, P2, and P3 is the same as long as the distance A-B is small with respect to the long optical distance D to the screen 26. This makes it possible to superimpose beams 22a, 22b, 22c, by adjusting mirrors 28a and 28c to form the composite image 25 on the screen 26. The light image 25 is thus changeable or modulated in color intensity. In one application of the invention an audio signal source 30 shown in FIG. 1 drives a color organ 32. This organ converts the audio signals to a plurality of frequency bands or channels I, II, and III, respectively high, medium, and low frequency of predetermined bandwidth. For example, the channel I may have a width of 15 kilocycles ranging from 5,000 hertz to 20,00 hertz; the channel II may have a width of 4 kilocycles ranging from 1,000 hertz to 5,000 hertz; and the channel III may have a width of 1 kilocycle ranging from 0 hertz to 1,000 hertz.

The channel I frequency is applied to the lamp 12a; the channel II frequency is applied to the lamp 12b and the channel III frequency is applied to the lamp 12c. The filters 18a, 18b, 18c may have three different colors, i.e. red, green and blue respectively. Thus, the beams 22a, 22b, and 22c will cast red, green, and blue images respectively upon the screen 26. The three images will vary in intensity in accordance with the amplitudes of the applied channels I, II, and III. The hue and intensity of the composite image 25 will vary in accordance with the variations in the frequency and amplitude of the signals emitted by the audio source 30.

Figure 4:
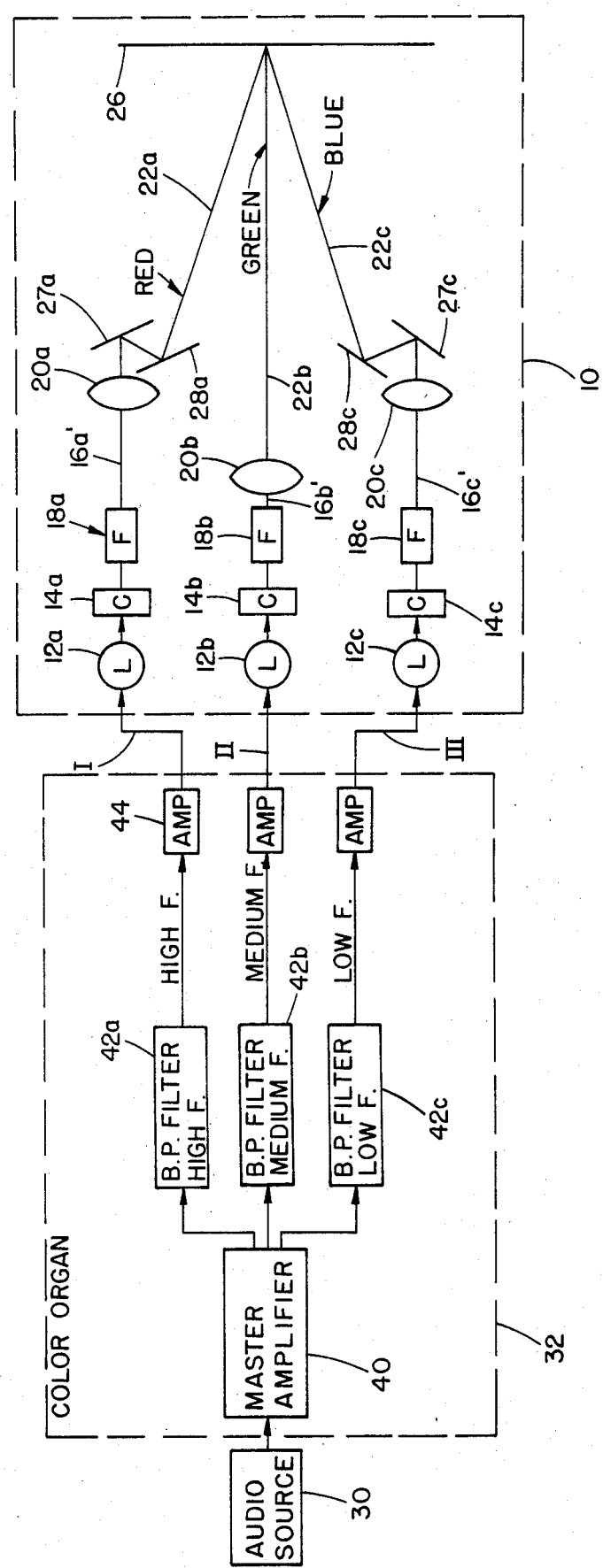
FIG. 4 is a block diagram of the system of FIG. 1 showing details of the color organ used therein.

FIG. 4 shows details of the color organ 32 employed with the optical system 10. Here an audio source 30 drives a master amplifier 40 of the color organ 32. The master amplifier 40 drives three band pass filters 42a, 42b and 42c respectively tuned to high, medium and low frequencies. Signals from the three channels I, II, and III are passed via respective amlifiers 44a, 44b, 44c to the respective lamps 12a, 12b, 12c, of the optical projection system 10. The respective collimators 14a, 14b, and 14c and respective filters 18a, 18b, 18c pass modulated red, green and blue beams via respective lenses 20a, 20b or 20c. The modulated beams from the respective lens 20a and 20c pass through respective mirrors 27a, 27c, 28a, 28c to the screen of the optical projection system 10. The respective filters 18a, 18b, 18c pass respective modulated red, green and blue light beams 16a', 16b', and 16c'. The green beam 16b' passes through the lens 20b and diverges as the beam 22b which is cast directly on the screen 26. The red beam 16a' passes through the lens 20a and via the mirrors 27a, 28a to define the divergent beam 22a which is cast on the screen 26. The blue beam 16c' passes through the lens 20c and via the mirrors 27c, 28c to define the divergent beam 22c which is cast on the screen 26. All the beams 22a, 22b and 22c cast superposed images which appear on the screen as the image 25 shown in FIG. 2.

It will be noted that the composite image 25 is produced by three modulated colored light beams whose images are superimposed on the screen 26, and the modulating instrumentality is the three-channel color organ 32.

Figure 3:
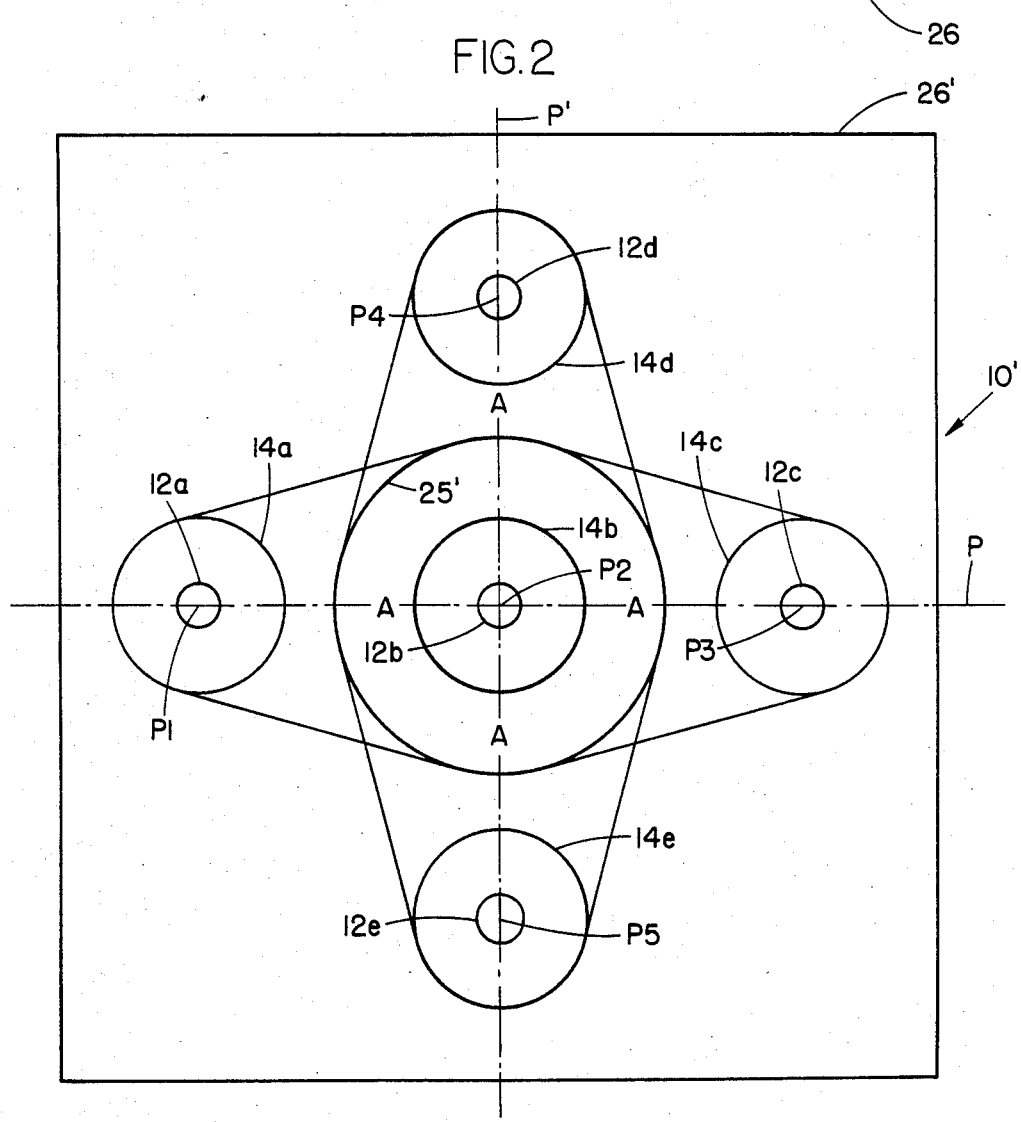
FIG. 3 is an optical diagram similar to FIG. 2 illustrating another embodiment of the invention, with five optical paths.
Figure 5:
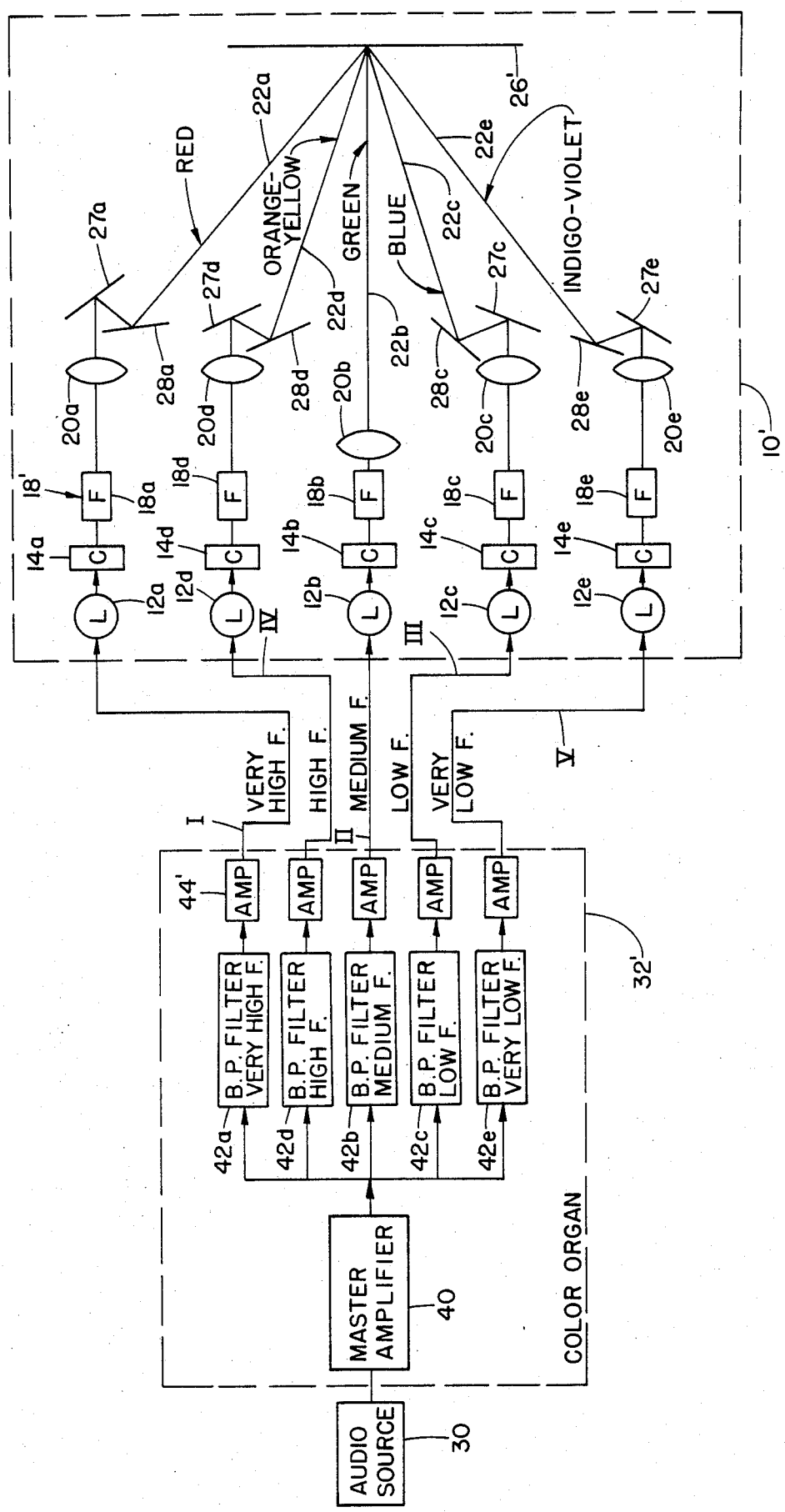
FIG. 5 is a block diagram similar to FIG. 4, with a color organ having five channels, and with a composite image projection system producing a composite image from five superimposed light beams, as illustrated diagrammatically in FIG. 3.

FIGS. 3 and 5 show how a system 10' can be provided with five optical paths P1-P5 and how a five-channel color organ 32' can produce five channels I-V to modulate five light beams in the five paths, and to superimpose five images to form a modulated composite image 25' on a screen 26'.

In the color organ 32' parts corresponding to those of the color organ 32 shown in FIG. 4 are identically numbered. Two additional band pass filters 42d and 42e are employed in addition to the filters 42a-42c. These filters can pass frequencies of any desired width, and the following will serve as an example. The channel V, 0 to 100 hertz; the channel IV, 100 to 1,000 hertz; the channel III, 1,000 to 5,000 hertz; the channel II, 5,000 to 10,000 hertz; and the channel I, 10,000 to 30,000 hertz.

The audio output of each respective band pass filter 42a-42e passes through an amplifier 44' to one respective lamp 12a-12e in the optical projection system 10'. Here the light is modulated then passed through five respective collimators 14a-14e, five color filters 18a-18e respectively, and five respective lenses 20a-20e. The beam 22b projects an image directly onto a screen 26'. The respective beams from the respective lenses 20a, 20c-20e are projected via respective fixed mirrors 27a, 27c-27e to respective movable mirrors 28a, 28c-28e, and the divergent beams 22a, 22c-22e are cast in superimposition with the beam 22b on the screen 26' to form a composite color image 25' (see FIG. 3) which is modulated in hue and intensity.

Further modulation of the composite image can be made by substituting one or more photographic slides and variously colored changing transparencies in place of simple passive colored filters 18 or 18' in the systems 10 and 10'.

In another application of the invention a full color composite image is produced from three black and white transparencies. For this application three identical transparencies are made on black and white film. Each image is made with one of a set of primary optical filters in front of the camera lens. Upon development each black and white transparency is combined with its primary filter to form a composite filter transparency. The three filter transparencies are placed in the composite image projector as 18a, 18b, and 18c. Each filter transparency is focused on screen 26 with its projection lens 20a, 20b, and 20c. Then the movable mirrors 28a, and 28c are adjusted until the three color images are superimposed. Once superimposed, the three projected images blend to produce a full color projection of the original scene.

In a modified version of the above, the transparencies are replaced by liquid crystal matrixes modulated by video signals and the color filters are chosen to match the spectral characteristics in the video cameras. For this mode the composite image projector, combined with the proper video and audio circuits, can be used as a color television projector.

Although not shown, if desired the focus and superimposition by the mirror assembly may be combined in one mechanical or electromechanical adjustment, i.e., by adjusting the distance C between the filter transparency and the lens and simultaneously proportionately adjusting the angle between the stationary and adjustable mirrors.

It should be understood that the foregoing relates to only a limited number of preferred embodiments of the invention which have been by way of example only and that it is intended to cover all changes and modifications of the example of the invention herein chosen for the purpose of the disclosure, which do not constitute departures from the spirit and scope of the invention.

What is claimed is:

1. A composite optical image projection system comprising:

a first lamp for emitting light in a first optical path;
   a first changeable optical filter-transparency disposed in said optical path for filtering said light emitted by said lamp;
   a first projection lens disposed in said optical path for focusing the light from said filter-transparency as a first divergent beam of light cast as a first image on an image receiving surface;
   a second lamp for emitting light in a second optical path;
   a second changeable optical filter-transparency disposed in said optical path for filtering said light emitted by said second lamp;
   a second projection lens disposed in said second optical path for focusing the light from said second filter-transparency as a second divergent beam of light;
   a mirror assembly disposed in said second optical path, and arranged to reflect said second divergent beam of light and cast a second image in superimposition with said first image on said image receiving surface to form a composite colored image;
   a third lamp for emitting light in a third optical path;
   a third changeable optical filter-transparency disposed in said optical path for filtering said light emitted by said third lamp;
   a third projection lens disposed in said third optical path for focusing the light from said third filter-transparency as a third divergent beam of light;
   another mirror assembly disposed in said third optical path, and arranged to reflect said third divergent beam of light and cast a third image in superimposition with said first and second images on said image receiving surface so that said composite image is modified by said third image;
   means for modulating said first, second, and third beams of light so that said composite image varies in hue and intensity ; and
   wherein said first named and said other mirror assembly are each comprised of a fixed mirror disposed at an angle to the respective optical path and a movable mirror rotatably adjustable on an axis parallel to the plane of the respective fixed mirror and wherein the distance between the centers of said respective fixed and movable mirrors is a first short distance so that said first named and said other mirror assembly may be adjusted to superimpose said second and third images on said first image to form a single composite image.

2. A composite optical image projection system as defined in claim 1 wherein said first, second, and third optical paths are laterally spaced apart a second short distance, and wherein said first lens is displaced said first short distance along said first optical path from said second and third lenses, and wherein said first lens is spaced a distance from said image receiving surface which is very long as compared with said first and second distances, so that said first, second, and third optical paths are substantially equal in length.

3. A composite optical image projection system as defined in claim 1 wherein said first, second, and third optical paths are disposed in a flat optical plane.

4. A composite optical image projection system as defined in claim 1 wherein said first and second optical paths are disposed in a first flat optical plane, and wherein said first and third optical paths are disposed in a second flat optical plane perpendicular to said first optical plane.

5. A composite optical image projection system as defined in claim 1, wherein said means for modulating said first, second, and third beams of light, comprises a color organ having a plurality of output channels of different frequency bandwidth, said output channels being respectively connected to said first, second, and third lamps to modulate the light emitted thereby, said organ having an input for receiving audio signals varying in amplitude and frequency, so that said composite colored image on said surface varies in hue and intensity in accordance with variations of amplitude and frequency of said audio signals.

6. A composite optical image projection system as defined in claim 1, wherein said filters are liquid crystal display matrices, and wherein said means for modulating said beams comprises video signal generating means connected to said crystal matrices.

7. A composite optical image projection system as defined in claim 1, further comprising:

a fourth lamp for emitting light in a fourth optical path, and a fifth lamp for emitting light in a fifth optical path;
   a fourth changeable optical filter-transparency disposed in said optical path for filtering said light emitted by said fourth lamp;
   a fifth changeable optical filter-transparency disposed in said optical path for filtering said light emitted by said fifth lamp;
   a fourth projection lens disposed in said fourth optical path for focusing filtered colored light from said fourth filter-transparency as a fourth divergent beam of light;
   a fifth projection lens disposed in said fifth optical path for focusing filtered colored light from said fifth filter-transparency as a fifth divergent beam of light;
   a further mirror assembly disposed in said fourth optical path, and arranged to reflect said fourth divergent beam of light and cast a fourth image in superimposition with said first, second and third images, on said image receiving surface so that said modified composite image is further modified by said fourth image;
   a still further mirror assembly disposed in said fifth optical path, and arranged to reflect said fifth divergent beam of light and cast a fifth image in superimposition with said first, second, third and fourth images, so that said modified composite image is further modified by said fifth image; and
   means for modulating said fourth beam of light and said fifth beam of light so that said further modified composite image varies in hue and intensity.

8. A composite optical image projection system as defined in claim 7, wherein said first, second, and third optical paths are disposed in a first flat optical plane, and wherein said second, fourth, and fifth optical paths are disposed in a second flat optical plane perpendicular to said first flat optical plane.

9. A composite optical image projection system as defined in claim 8, wherein said means for modulating siad first, second, third, fourth, and fifth beams of light, comprises a color organ having a plurality of output channels of different frequency bandwidth, said output channels being respectively connected to said first, second, third, fourth, and fifth lamps to modulate the light emitted thereby, said organ having an input for receiving audio signals varying in amplitude and frequency, so that said composite colored image on said surface varies in hue and intensity in accordance with variations of amplitude and frequency of said audio signals.

* * * * *